May 12, 1942.                E. A. ZEMPEL                2,282,919
                              BORING BAR
                         Filed Dec. 30, 1940
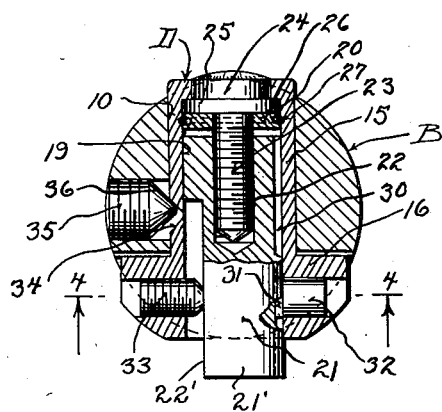
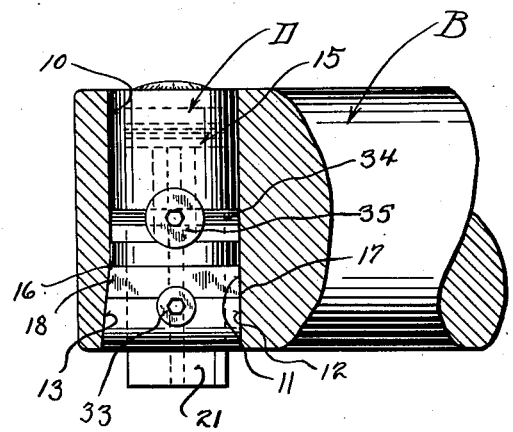
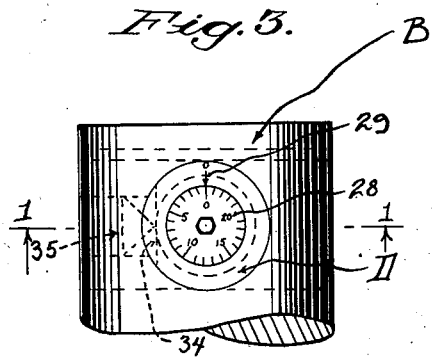
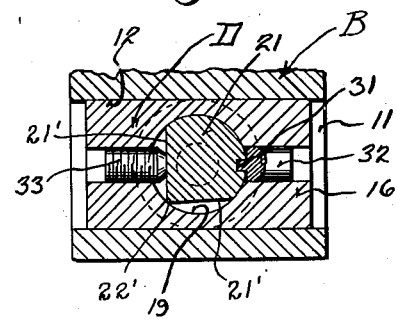
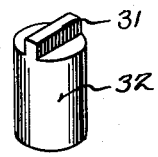
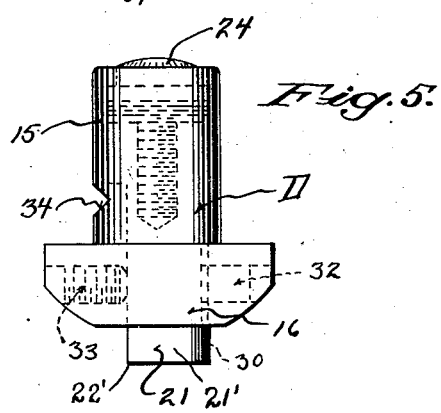
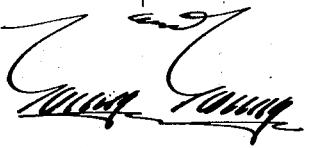
Inventor
E. A. Zempel
By
Attorneys Patented May 12, 1942

2,282,919

UNITED STATES PATENT OFFICE 2,282,919

BORING BAR

Edward A. Zempel, Milwaukee, Wis.

Application December 30, 1940, Serial No. 372,385

6 Claims. (Cl. 77—58)

This invention appertains to rotary cutting tools, and more particularly to boring bars.

One of the primary objects of my invention is to provide a novel tool carrier for boring bars, which can be readily and quickly associated with or removed from a boring bar, as a unit, without disturbing the fine micrometric adjustment of the cutting tool, whereby different units and tools of different characters (for roughing and finishing work) can be used with the same boring bar.

Another salient object of my invention is to provide a novel means for mounting the cutting tool in the tool carrier, whereby the same will be effectively supported and held against turning movement, and whereby the desired micrometric adjustment of the cutting tool can be had in the carrier.

A further object of my invention is to provide novel means for mounting the tool carrier in the boring bar, whereby the same can be rigidly clamped in place against accidental movement, and whereby chattering of the carrier and tool will be prevented, irrespective of the length of time the carrier and bar are used.

A further important object of my invention is to provide a detachable unit including the cutting tool, carrier, adjusting mechanism for the tool, etc., which can be associated with boring bars of conventional form with very slight change thereto.

A still further object of my invention is to provide a boring bar having a diametrically extending opening and cross slot at one side communicating with one end of the opening, the rear face of the slot being formed straight, and the front face being formed with an inclined surface, and a detachable unit including a tool carrier having a barrel received in the opening and a crosshead fitted in the slot, the rear face of the head being straight, and the front face of the head being formed on an incline, with means for forcing the unit in the bar with the inclined faces of the head and slot in engagement for bringing the flat faces of the head and slot in tight contact for carrying the load incident to the rotation of the bar.

With these and other objects in view, the invention consists in the novel construction, arrangement, and formation of parts, as will be hereinafter more specifically described, claimed, and illustrated in the accompanying drawing, in which drawing:

Figure 1 is a transverse, sectional view through my improved boring bar, taken on the line 1—1 of Figure 3 looking in the direction of the arrows, and illustrating the adjustment for the cutting tool and the means for clamping the carrier of the units in the boring bar.

Figure 2 is a fragmentary, side, elevational view of the forward end of the boring bar, with parts of the bar broken away and in section to illustrate my detachable unit.

Figure 3 is a fragmentary top plan view of the front end of the boring bar, constructed in accordance with my invention.

Figure 4 is a detail, sectional view taken on the line 4—4 of Figure 1, looking in the direction of the arrows, illustrating the means for preventing turning movement of the cutting tool and the means for clamping the cutting tool in its desired adjusted position.

Figure 5 is a front, elevational view of my novel unit removed from the boring bar.

Figure 6 is an enlarged, detail, perspective view of the pin utilized for holding the cutting tool against turning movement.

Referring to the drawing in detail, wherein similar reference characters designate corresponding parts throughout the several views, the letter B indicates a boring bar, and D my novel detachable unit therefor.

In accordance with my invention, the boring bar B adjacent its front end is provided with a diametrically extending opening 10 and a cross slot 11 on one side communicating with one end of the opening. The rear wall 12 of the slot is formed straight, that is, at right angles to the longitudinal axis of the boring bar. The front face 13 of the slot is arranged on an incline and extends rearwardly and inwardly toward the axial center of the bar.

Thus, a conventional boring bar B can be utilized, and the same can be properly machined to form the opening 10 and my cross slot 11 with its particular form.

My detachable unit D includes a barrel 15, which is adapted to be fitted within the opening 10, and one end of the barrel has formed thereon a crosshead 16, which is adapted to fit within the slot 11. The inner face of the crosshead 16 is formed with a straight flat surface 17, and the front face of the head is provided with a rearwardly and inwardly inclined face 18. The crosshead fits within the cross slot, and the straight face 17 of the head fits against the straight rear wall 12 of the slot, while the inclined face 18 of the crosshead fits against the inclined wall 13 of the slot.

The barrel 15 has its bore 19 provided with an internal shoulder 20 at the end thereof, which is remote from the crosshead 16. Slidably mounted within the barrel 15 is the cutting tool 21, and this cutting tool protrudes through and beyond the crosshead. The cutting tool can be formed from high-speed steel, or the same can be provided with a "Stellite" tip or a tungsten carbide tip. The inner end of the cutting tool is formed round to snugly fit within the barrel, and the outer end of the tool is provided with flat faces 21' to form the cutting edge 22'.

A longitudinally extending, internally threaded bore 22 is formed in the inner end of the cutting tool, and this internally threaded bore receives the threaded stem 23 of the micrometer adjusting screw 24. The head of the adjusting screw has formed thereon an annular shoulder 25, which fits against the shoulder 20 formed in the barrel. The shoulder 25 is held against the shoulder 20 by a fastening disc 26, and this fastening disc carries a split resilient ring 27, which is adapted to snap into and out an internal groove formed in the bore of the barrel 15. The outer face of the head of the adjusting screw is calibrated, as at 28, and the end of the barrel is provided with an indicating pointer or mark 29 for cooperation with the scale on the head of the screw. The head of the screw is provided with a suitable tool-receiving socket, whereby said screw can be conveniently turned to adjust the cutting tool in and out.

In order to prevent the accidental turning of the cutting tool, the same is provided with a longitudinally extending guide slot 30, which receives the rib 31 formed on the inner end of a pin 32, which has a drive fit within the crosshead. After the cutting tool has been adjusted to the desired position, the same is held against movement by a set screw 33, which is threaded in the crosshead 16 against one flat face of the cutting tool.

The outer face of the barrel 15 at right angles to the crosshead 16 is provided with a V-shaped groove 34, and an adjusting set screw 35 is threaded into the boring bar, and the inner end of this adjusting set screw has formed thereon a conical tip 36, which is adapted to bear against the inner inclined wall of the groove 34.

When the detachable unit D is to be associated with the bar B, the adjusting set screw 35 is threaded out, and the unit D is slipped into the boring bar. The screw 35 is now turned inwardly until the conical tip thereof bears firmly against the inner inclined wall of the V-shaped groove 34. The conical tip bearing against the inclined wall forces the unit tight into the opening 10 and the cross slot 11, with the inclined face 18 in engagement with the inclined wall 13 of the slot. This forces the straight face 17 of the crosshead into tight contact with the straight wall 12 of the slot, and these straight faces give a large bearing surface for taking up strains and stresses incident to the turning of the boring bar. Due to the torque set up, the greatest stress is against the flat wall 12 of the cross slot, and as a large bearing surface is provided, the boring bar will effectively carry the stresses and strains.

In all boring bars with which I am familiar, the tool bearing against the boring bar wears the boring bar away, and this allows the chattering of the tool, and where undue play is present the tool sometimes is snapped off.

With my novel arrangement and formation of parts, the entire unit D with the cutting tool can be instantly removed from the boring bar by the mere loosening of the adjusting screw 35. This allows the convenient re-sharpening of the cutting tool without disturbing the fine adjustment of the cutting tool, and as the unit can be freely removed from the bar, I can provide several units for one bar, that is, I can provide one unit with a cutting tool for roughing and another unit with a cutting tool for finishing, and I am permitted to maintain accuracy in adjustment to give the exact size to the work being operated upon.

The set screw 33 not only functions to clamp the cutting tool in the carrier, but also limits the outward adjustment of the cutting tool, and this prevents the accidental turning out of the adjusting screw 24 from the cutting tool.

From the foregoing description it can be seen that I have provided an exceptionally simple and durable unit for boring bars, or the like.

For double end boring, it is merely necessary to double the unit.

In some instances, it may have been desirable to employ a master bar, and setting gauge to allow setting of the cutter to desired cutting size away from the bar and machine.

Changes in details may be made without departing from the spirit or the scope of my invention, but what I claim as new is:

1. A boring tool comprising, a bar having an opening therein and a cross slot on one side communicating with the opening, and a detachable unit for association with the bar including a carrier having a barrel fitted in the opening and a crosshead integral therewith fitted in the slot, a cutting tool slidably mounted in the barrel and extending outward beyond the crosshead, means for adjusting the cutting tool in the barrel, and means for detachably and firmly clamping the unit in the bar.

2. A boring tool comprising, a bar having an opening therein and a cross slot on one side communicating with said opening, said cross slot having an inner flat face, a detachable unit removably associated with the bar including a carrier having a barrel fitted in the opening and a crosshead integral therewith fitted in the slot, the inner wall of the crosshead having a smooth flat surface for intimate contact with the flat wall of the groove, means detachably clamping the carrier in the bar and for forcing the flat surface of the head into intimate contact with the flat wall of the groove, a cutting tool slidably mounted in the barrel and extending outwardly beyond the crosshead, and means for adjusting the cutting tool in the barrel.

3. A boring tool comprising, a barrel having an opening and a cross slot on one side communicating with the opening, the inner wall of the cross slot being formed straight, the forward wall of the cross slot being on an incline and extending rearwardly and inwardly, a detachable unit for association with the bar including a carrier having a barrel detachably fitted in the opening and a crosshead integral therewith fitted in the slot, the rear surface of the crosshead being formed flat, the front surface of the crosshead being on an incline and extending rearwardly and inwardly for engaging the inclined front wall of the slot, a cutting tool slidably mounted in the barrel, means for adjusting the tool in said barrel, and means for firmly clamping the carrier in the bar and for drawing the inclined surface of the head in engagement with the inclined wall of the cross slot, whereby the straight surface of the crosshead will be brought into intimate bearing contact with the straight wall of the slot.

4. A boring tool comprising, a barrel having an opening and a cross slot on one side communicating with the opening, the inner wall of the cross slot being formed straight, the forward wall of the cross slot being on an incline and extending rearwardly and inwardly, a detachable unit for association with the bar including a carrier having a barrel detachably fitted in the opening and a crosshead integral therewith fitted in the slot, the rear surface of the crosshead being formed flat, the front surface of the crosshead being on an incline and extending rearwardly and inwardly for engaging the inclined front wall of the slot, a cutting tool slidably mounted in the barrel, means for adjusting the tool in said barrel, and means for firmly clamping the carrier in the bar and for drawing the inclined surface of the head in engagement with the inclined wall of the cross slot, whereby the straight surface of the crosshead will be brought into intimate bearing contact with the straight wall of the slot, said last-named means including a V-shaped groove on one side of the barrel and an adjusting set screw threaded into the bar having a pointed tip for contact with the inner inclined wall of the V-shaped groove.

5. A boring tool comprising, a boring bar having an opening therein and a cross slot on one side communicating with one end of the opening, a unit removably associated with the bar including a barrel fitted within the opening and a crosshead integral therewith fitted in the slot, means for detachably securing the unit in the bar, a cutting tool slidably mounted in the barrel, and means carried wholly by the barrel for adjusting the cutting tool.

6. A removable unit for boring bars comprising, a carrier including a barrel and an integral crosshead, the barrel having an internal shoulder at one end, a cutting tool slidably mounted in the barrel having a flat surface on one side and a longitudinally extending groove on the other, means carried by the carrier fitting in the groove for preventing rotation of the cutting tool, a set screw carried by the carrier for engaging the flat surface of the cutting tool for holding the same in an adjusted position, said screw also limiting the outward movement of the tool in the barrel, an adjusting screw having a shoulder on its head fitted against the shoulder in the barrel, means rotatably supporting the set screw in the barrel, and said cutting tool having an internally threaded bore for receiving the stem of the adjusting screw.

EDWARD A. ZEMPEL.